United States Patent [19]

Rodriquez

[11] Patent Number: 5,217,127
[45] Date of Patent: Jun. 8, 1993

[54] VACUUM ACTIVATED POWER TAKE OFF FOR WINCH

[76] Inventor: George Rodriquez, P.O. Box 4492, Key West, Fla. 33040

[21] Appl. No.: 515,225

[22] Filed: Apr. 27, 1990

[51] Int. Cl.[5] .......................................... B60K 23/08
[52] U.S. Cl. .................................................. 212/172
[58] Field of Search .......................... 414/563, 560; 212/170–174; 200/61.86, 830, 832; 180/53.6, 53.61, 53.62, 53.7, 53.1; 192/85 R, 85 V, 86, 88 R

[56] References Cited

U.S. PATENT DOCUMENTS

| | | | |
|---|---|---|---|
| 2,128,010 | 8/1938 | Miller | 212/173 |
| 2,136,454 | 11/1938 | Miller | 212/174 |
| 2,162,994 | 6/1939 | Baker | 212/172 |
| 2,206,771 | 7/1940 | Dugas | 192/86 |
| 2,307,611 | 1/1943 | Webster | 414/563 |
| 2,356,598 | 8/1944 | Lang et al. | 192/86 |
| 2,687,004 | 8/1954 | Rappl | 192/86 |
| 2,975,875 | 3/1961 | Edelblut | 192/86 |
| 4,858,716 | 8/1989 | Kano et al. | 192/85 V |
| 4,960,192 | 10/1990 | Kurihara | 192/85 V |

FOREIGN PATENT DOCUMENTS

| | | | |
|---|---|---|---|
| 87995 | 11/1936 | Sweden | 212/172 |
| 932102 | 7/1963 | United Kingdom | 212/174 |

*Primary Examiner*—Jesus D. Sotelo
*Assistant Examiner*—Stephen P. Avila
*Attorney, Agent, or Firm*—Malloy & Malloy

[57] ABSTRACT

A vacuum actuated power take off assembly for a winch which is preferably mounted on a vehicle and part of a tow truck structure of the type commonly known. A power shaft is connected in cooperative relation to the transmission vehicle and an activating means is operated through manipulation of a fluid operable switch which directs the negative pressure from the internal combustion engine to a fluid power drive structure which serves to dispose a connecting gear between the drive shaft and a power take off of the transmission into and out of operative position relative to drivingly attaching the drive shaft to the transmission for operation of the winch.

7 Claims, 4 Drawing Sheets

VACUUM ACTIVATED POWER TAKE OFF FOR WINCH

BACKGROUND OF THE INVENTION

1. Field of the Invention

A vacuum activate power take off assembly to drive a winch on a vehicle wherein the vacuum or negative pressure is selectively directed from the internal combustion engine of the vehicle for engagement in disengagement of the winch with the transmission of the vehicle.

2. Description of the Prior Art

The structure of a winch mounted on a vehicle which is commonly known as a tow truck for purposes of towing other vehicles or for other lifting or pulling purposes is, of course, very well known in the art. The U.S. Pat. No. 4,099,628 to Richardson, is representative of such a towing vehicle. Richardson shows a tow truck having a frame and drive train for a proportion of the vehicle including a turntable mounted on the frame for rotation of the boom assembly by vertical axis the Richardson patent is directed to numerous structural components which accomplish adjustment of the boom assembly about a horizontal axis including a drive assembly for the rotatable turntable. In this structure, the winch is electrically operated independently of the vehicle train and is controlled by a control box electrically coupled to the drive motors of a cable connected to the vehicle by means of a self-winding cable wheel. A set of controls is provided in the passenger compartment or cab of the vehicle.

Similarly, Francis, U.S. Pat. No. 2,604,302, discloses a truck crane to be mounted on a vehicle including a pulling winch.

The patent to McKinney, et al, discloses a cable injecting device which operates off a pressure fluid reservoir and is activated thereby through control and direction of the fluid under pressure to the drive portions of the assembly.

In addition to the above, the patent to Workman, U.S. Pat. No. 3,633,875, discloses a pneumatic balancing hoist comprising a frame rotatably supporting a hollow drum upon which is wound a cable or similar flexible element. The hollow drum includes a pressure chamber containing a piston movable in response to pressurization of the chamber. A piston includes a plurality of cam rollers each of which are engaged by a rotatable cam member. Workman is absent any type of negative pressure take off being controlled by a fluid operable switch to serve to selectively connect or disengage the drive mechanism of a vehicle mounted winch to the transmission thereof.

In typical and well-known fashion, winch is mounted on vehicles and used in tow truck are generally "mechanically" connected and disconnected to a power take off portion of the transmission of the vehicle. The mechanical operation of conventional and/or prior art structures is accomplished by means of metal cables or the like physically manipulated by an operator. Due to the friction involved in the manipulation and mechanical positioning of interconnecting drive linkage of the power take off with the drive train of the winch itself considerable force is required by the operator to establish an operative drive connection to the winch. This is inconvenient, time consuming and generally undesirable. Accordingly, there is a need in this area for an assembly which more conveniently and effectively serves to activate the winch or more specifically the drive chain associated therewith such that the winch is selectively operable for use in the field.

SUMMARY OF THE INVENTION

The present invention is directed to a vacuum or negative pressure activated power take off assembly used to selectively connect or disconnect a winch to a power take off of a drive assembly. In a preferred embodiment to be described in greater detail hereinafter, the winch is vehicle mounted and part of what is conventionally known as a tow truck or like structure. Obviously, the assembly of the present invention is not necessarily limited to vehicular application.

The winch is connected by any type of drive to a drive shaft wherein the drive shaft is attached in cooperative relation to the transmission of the vehicle or other drive assembly. An activating means is also connected to the transmission and includes a connecting gear which is selectively positionable into and out of an operative position. The operative position, in the environment described hereinafter, is defined by the connecting gear being drivingly attached to the drive shaft and being driven by a power take off of the transmission of the vehicle. The activating means further includes a positioning rod or shaft or like link which is movable by negative fluid pressure and which is attached to the connecting gear for the selective positioning of the connecting gear into and out of the aforementioned operative position.

A negative pressure or vacuum source is normally found on the internal combustion engine of the vehicle. This negative pressure source communicates with a switch assembly. The switch assembly is fluid operable to the extent that the switch serves to direct or communicate the negative pressure or vacuum selectively to the activating means so as to control its movement. This, in turn, controls the movement or positioning of the aforementioned connecting gear and, in turn, allows an operator to selectively positioning the connecting gear into and out of its operative position or in interconnecting relation between a power take off of the transmission of the vehicle and the drive shaft.

The switch assembly includes a manually-operated shaft, rod or the like, accessible preferably in the passenger compartment of the vehicle and being interconnected to a seal assembly located within a casing. An "inlet" and two "outlets" are connected to a hollow interior casing which is effectively air tight or resistant to leakage. Manipulation of the connecting rod or shaft by an operator in the passenger compartment will serve to position a plurality of seal structures of the seal assembly so as to selectively communicate the "inlet" independently with either of the two outlets. Through additional conduit means, the two outlets are connected to opposite sides of a housing in which a flexible material diaphragm is located. Flexibility is of a sufficient degree to allow it to be moved when subjected to fluid pressure. The diaphragm is connected to the attachment or connecting linkage which is movable with the connecting gear and cooperates with the transmission. It should be apparent, therefore, that through manipulation of the aforementioned switch assembly, the negative pressure will be directed to either one side or the other of the diaphragm causing it to move in a preferred direction and thereby causing the positioning or travel of the flexible material diaphragm within a housing of the activating means. "Mechanical" positioning or manipulation through cables or like structures is thereby eliminated along with many problems associated with the prior art as set forth above.

BRIEF DESCRIPTION OF THE DRAWINGS

For a fuller understanding of the nature of the present invention, reference should be had to the following detailed description taken in connection with the accompanying drawings, in which.

Like reference numerals refer to like parts throughout the several views of the drawings.

DETAILED DESCRIPTION OF THE PREFERRED EMBODIMENT

Figure 1:
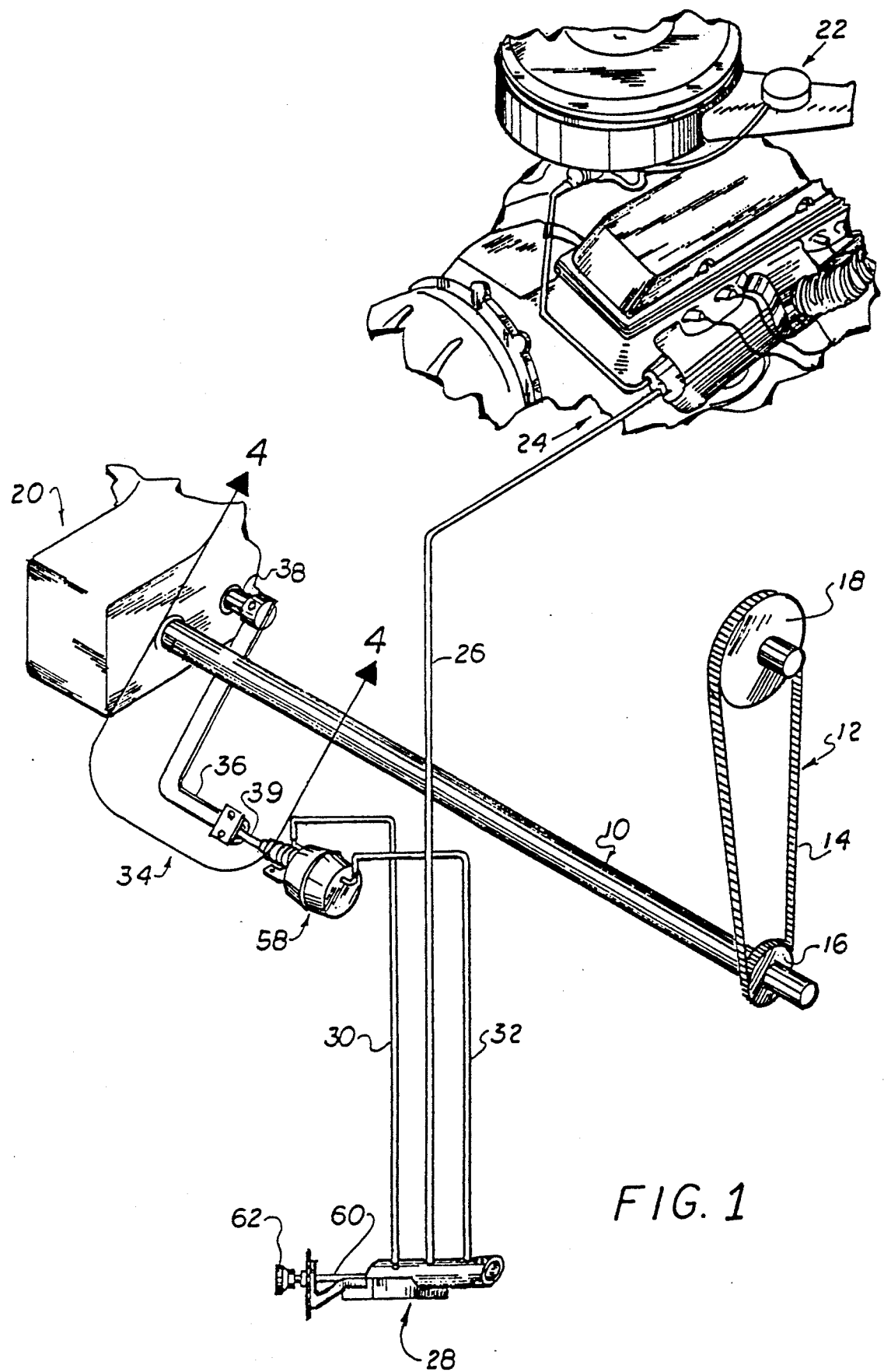
FIG. 1 is a perspective view and partial cutaway showing the components of the various invention.
Figures 2, 3:
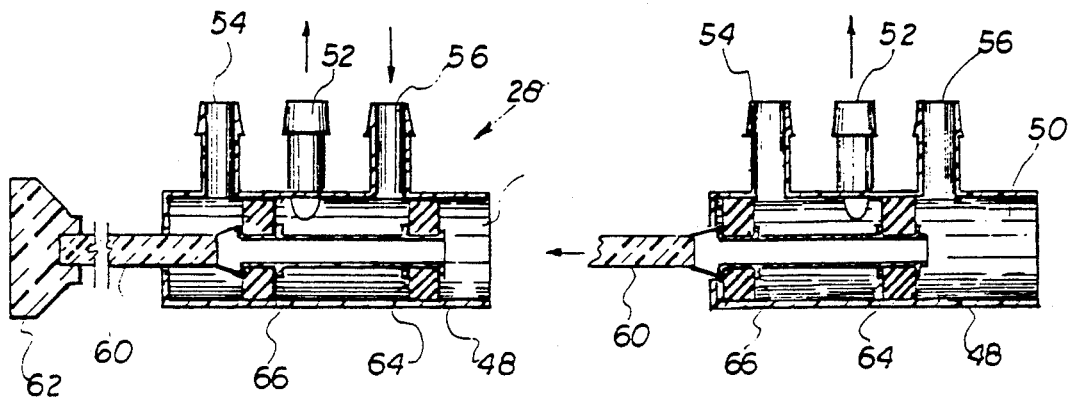
FIG. 2 is a longitudinal sectional view of a switch assembly of the present invention.
FIG. 3 is a longitudinal sectional view of the embodiment of FIG. 2 at a different position.
Figure 8:
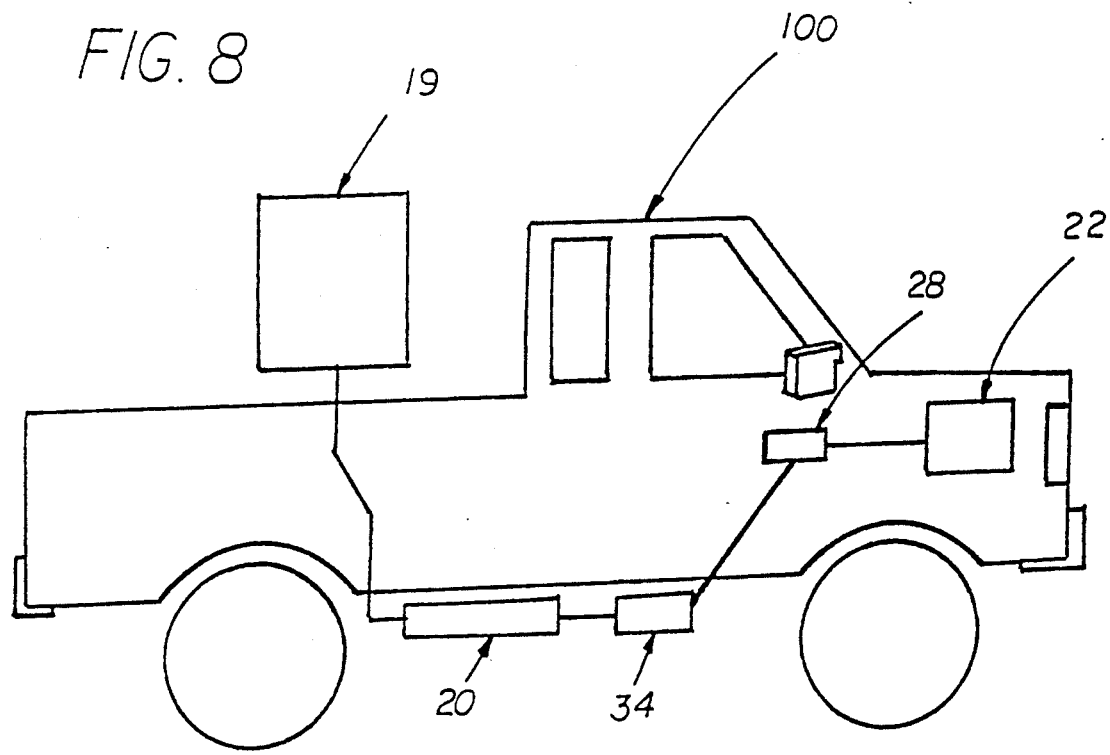
FIG. 8 is a block diagram illustrating the inter-relation of the component elements of the present invention as utilized on a vehicle.

As shown in FIG. 1, the assembly in the present invention comprises a drive shaft generally indicated as 10 having one end or portion thereof connected to some type of gear or linkage assembly generally indicated as 12. In the specific embodiment shown in FIG. 1, a drive chain or belt 14 is by its interconnection to a gear structure 16 secured to and rotatable with the drive shaft 10. The opposite end of the belt 14 serves to drive an activating or power gear 18 which may be connected directly to a winch assembly 19 for rotation thereof. The opposite end and/or other portion of the drive shaft 10 is connected in cooperative relation to a transmission assembly 20 which defines a drive assembly. The transmission 20 may be considered part of a vehicle 100, as illustrated in FIG. 8, such as a tow truck or the like.

An internal combustion engine, generally indicated as 22, also is considered part of the aforementioned vehicle 100 on which the winch assembly (not shown for purposes of clarity) may be mounted. As is conventional with I.C. engines, a source of negative pressure generally indicated as 24 may normally be associated therewith. This negative pressure is connected by appropriate conduit 26 to a switch assembly generally indicated as 28. Additional conduits as at 30 and 32 connect the switch assembly 28 to an activating means generally indicated as 34.

Figure 4:
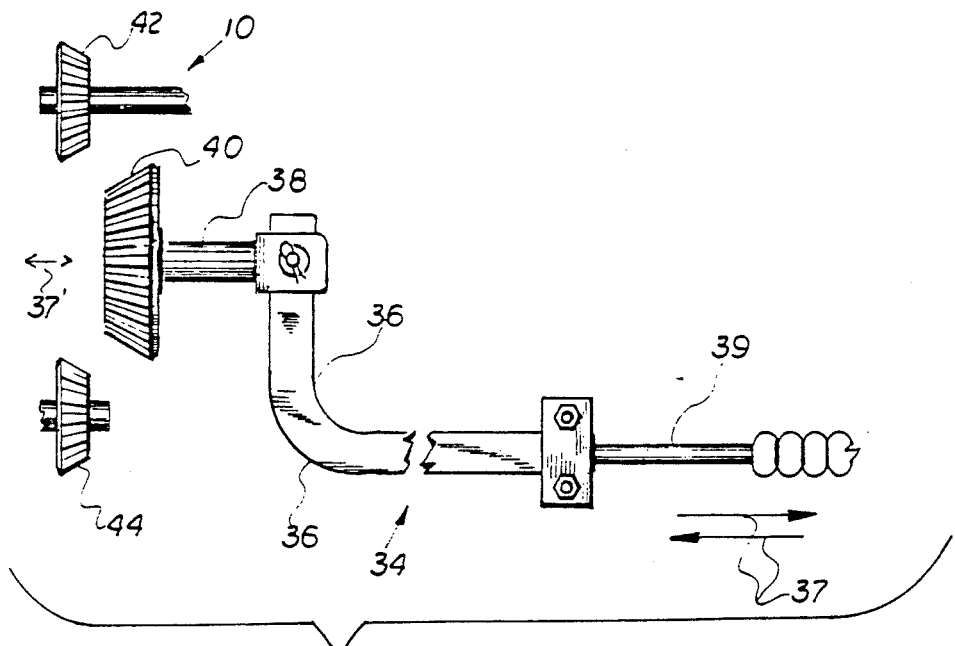
FIG. 4 is a side view and partial cutaway of connecting linkage of the activating means.

The activating means, when positionable through negative fluid pressure applied thereto, serves to move an attachment or connecting link 36 in substantially opposite directions as shown by the directional arrows 37 of FIG. 4. A position or connecting rod or shaft 38 is connected to a connecting gear 40 which is mounted on the interior of the transmission 20 and is selectively positionable into and out of interconnection between a driven gear 42 associated with and rotatable with the drive shaft 10 and a power take off gear 44 normally associated with the transmission 20. In its operative position, the connecting gear 40 interconnects both gears 44 and 42 and serves to drive the gear 42 and thereby rotate the drive shaft 10. In the aforementioned operative position, the connecting gear 40 is driven by the power take off 44 associated with the transmission 20.

With reference primarily to FIGS. 1–5 and 7–8, the switch assembly generally indicated as 28 comprises a housing or casing 48 having a hollow interior as at 50. An inlet port 52 serves to interconnect the interior of the casing 50 with a source of negative pressure as at 24 supplied by the internal combustion engine 22. Therefore, when in a "neutral" position, the interior of the chamber 50 communicates and is under a negative pressure by means of communication of such negative pressure through conduit 26. Two outlet ports 54 and are connected respectively by conduits 30 and 32 to a fluid type chamber 58 best shown in FIG. 6. The casing 58 communicates by means of conduits 30 and 32 with a source of negative pressure. To accomplish positioning of gear 40 in the operative position, a positioning rod 60 which is hand positionable or operable includes a handle or knob 62 and is mounted within the passenger compartment of the vehicle. The rod is connected on the interior of the chamber as at 50 to two seal structures 64 and 66 which are positionable along with the rod into and out of sealing engagement with the outlet ports 54 and 56.

Figure 6:
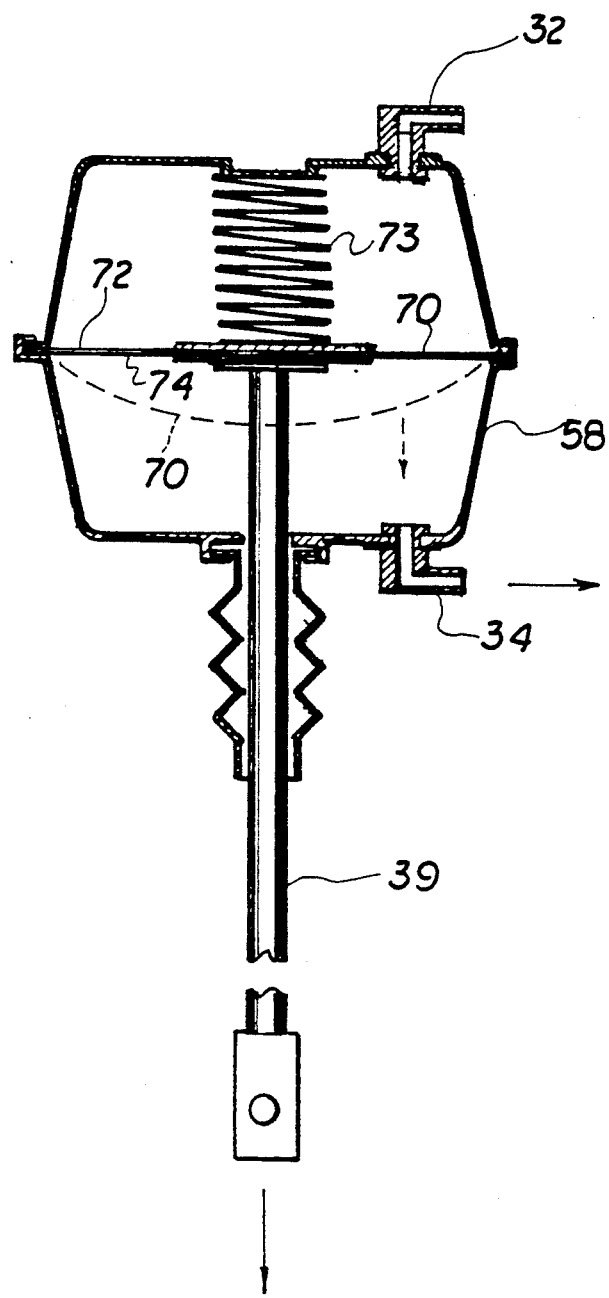
FIG. 6 is a sectional interior view of a positioning mechanism associated with the activating and positioning portion of the present invention.

Moving the seal structures appropriately within the interior 50 of the casing 48 of the switch assembly 28 will selectively and independently communicate the inlet port 52 and one of the outlet ports 54 and 56 with the source of negative pressure. This negative pressure will be communicated through respective conduits 30 and 32 to opposite sides of a flexible material diaphragm 70 movable within the casing or housing 58 by subjecting the diaphragm and more particularly opposite sides thereof 72 and 74 to the vacuum or source of negative pressure. When, for example, the side 74 of the housing or chamber 58 is under the influence of vacuum, the diaphragm 70 will move in that direction causing the connecting linkage 34 (See FIG. 4) to move in the direction of the diaphragm. Similarly, connecting or communication of the negative pressure with the opposite sides 72 of the housing 58 relative to diaphragm 70 will cause the diaphragm to move in the opposite direction and of course the connecting linkage or structure 34 to move in the same direction as the diaphragm. This, of course, will serve to move the connecting gear 40 into and out of its operative position as defined above. Also note that the diaphragm 72 in the embodiment of FIG. 6 is spring bias toed to assume a somewhat neutral position as shown.

Figure 5:
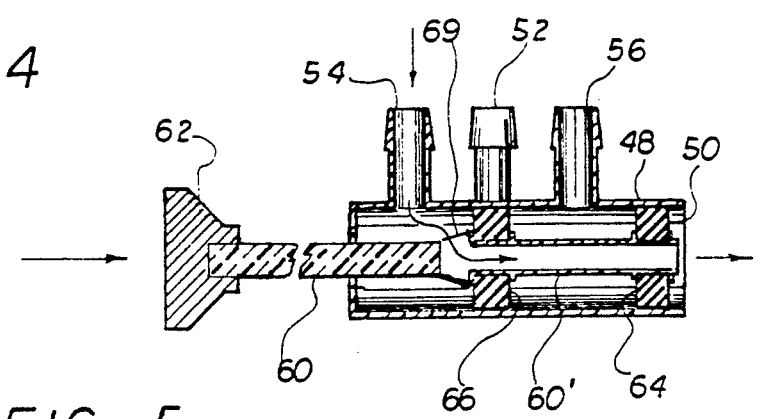
FIG. 5 is a longitudinal sectional view of the embodiments of FIGS. 2 and 3 at a different position.

With reference to FIG. 5, a neutral or a venting position is shown wherein the switch assembly 28 includes a hollow interior end of rod 60 as at 60'. Venting or return of pressure as indicted by the appropriate arrows passing through a valve and/or vent opening 69. The vented fluid is passed to atmosphere through the opened end of the chamber 48.

Figure 7:
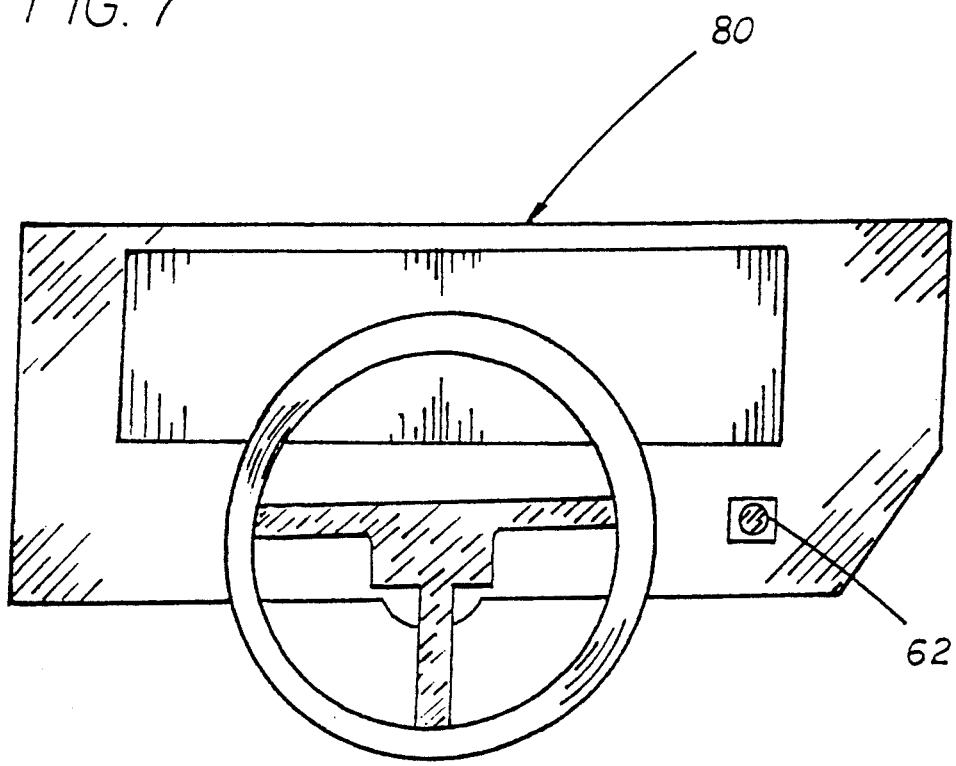
FIG. 7 is a front plan view of a preferred embodiment of the push rod mounting in a vehicle passenger compartment.

In operation, an operator will merely enter the operator's compartment, start the motor, engage the clutch, manipulate the positioning rod or shaft 60 and knob 62 to operatively position the seal structure 64 and 66 so as to communicate the vacuum through the inlet port 52 to one of the outlet ports 54 and 56 in order to connect or disconnect the winch by means of positioning the connecting gear 40 into its operative position relative to the driven gear 42 associated with the drive shaft 10 and the power take off 44 associated with the transmission 20 of the vehicle. With reference to FIG. 7, the switch assembly 28 may be mounted in such a manner that knob 62, protrudes and is easily accessible on the face of the dash of the vehicle passenger compartment 80.

Now that the invention has been described, what is claimed is:

1. For use in combination with a vehicle, such as a tow truck, having a winch to be driven by a drive assembly of the vehicle, a vacuum activated power take off assembly for drivingly engaging and disengaging the winch, said assembly comprising:
    a negative pressure source disposed adjacent to the winch,
    an inlet conduit structured to transfer negative pressure from said negative pressure source to a fluid operable switch assembly,
    said fluid operable switch assembly structured to selectively transfer the negative pressure to one of two outlet conduits,
    said outlet conduits structured to transfer negative pressure between said fluid operable switch assembly and opposite sides of activating means,
    said activating means including a fluid actuated drive structure and a connecting gear for selectively connecting and disconnecting a drive shaft in driving engagement with the drive assembly,
    said fluid actuated drive structure including a housing connected in fluid communication with said switch assembly, and a flexible material diaphragm movably mounted within said housing and forced into and out of operative positions upon negative pressure being applied to said opposite sides thereof within said housing,
    said operative position defined by driven connection of said connecting gear to the drive assembly, and
    linkage means interconnecting said drive shaft to said activating means so as to position said drive shaft in communicating relation to the drive assembly.

2. An assembly as in claim 1 wherein said winch is vehicle mounted and said source of negative pressure comprises a vacuum take off from an internal combustion engine of the vehicle.

3. An assembly as in claim 2 wherein the drive assembly comprises a power take off of a transmission of the vehicle, said drive shaft attachable in driven connection with said power take off by said connecting gear disposed in said operative position.

4. An assembly as in claim 3 wherein said activating means comprises an attachment rod connected to said diaphragm and movable therewith, said attachment rod attached to said connecting gear and movable therewith to position said connecting gear into and out of said operative position.

5. An assembly as in claim 4, wherein said switch assembly comprises a hollow interior casing having at least one said inlet port and two said outlet ports and a seal assembly selectively positionable to establish fluid communication independently between said inlet port and each of said outlet ports.

6. An assembly as in claim 5, wherein said seal assembly comprises a push rod, and a plurality of spaced apart seals connected thereto and movable therewith relative to said inlet port and said outlet ports within said casing.

7. An assembly as in claim 6 wherein said push rod is mounted within a passenger compartment of the vehicle.

* * * * *